United States Patent [19]

LeRoy et al.

[11] 4,020,443
[45] Apr. 26, 1977

[54] VARIABLE TEMPERATURE SENSOR

[75] Inventors: Rodney L. LeRoy, Pointe Claire;
David H. Grossman, Mount Royal;
R. Douglas McDonald, Baie d'Urfee;
David F. Hemmings, Montreal, all of
Canada

[73] Assignee: Canada Wire and Cable Limited,
Toronto, Canada

[22] Filed: June 3, 1975

[21] Appl. No.: 583,254

[30] Foreign Application Priority Data

Apr. 18, 1975   Canada .............................. 224930

[52] U.S. Cl. ............................... 338/28; 73/362.8;
338/22 R; 338/25
[51] Int. Cl.$^2$ ......................................... H01C 7/04
[58] Field of Search ............................ 338/22–26,
338/28; 73/DIG. 7, 362.8; 307/310

[56]  References Cited
UNITED STATES PATENTS

| 3,019,404 | 1/1962 | Fastenau et al. | 338/28 |
| 3,111,844 | 11/1963 | Van Luik, Jr. | 73/DIG. 7 |
| 3,247,714 | 4/1966 | Schwabe et al. | 73/DIG. 7 |
| 3,537,315 | 11/1970 | Ames | 73/362.8 |
| 3,846,776 | 11/1974 | Kahn | 338/22 X |

Primary Examiner—C. L. Albritton
Attorney, Agent, or Firm—Spencer & Kaye

[57] ABSTRACT

A variable temperature sensor for detecting and/or controlling the temperature of an object is disclosed. The variable temperature sensor comprises a thermally conductive probe having one end adapted to contact the object the temperature of which is to be sensed, measured and/or controlled and its other end adapted to contact a heat sink so as to create a predetermined temperature profile between the two ends of the thermally conductive probe, and a temperature sensing device having a predetermined temperature sensing point or range contacting the thermally conductive probe at a point which is substantially at the temperature sensing point or within the temperature sensing range of the sensing device. The probe will permit detection and/or control of the temperature of an object which is above the temperature sensing point or range of the temperature sensing device when the heat sink temperature is below the temperature sensing point or range of the sensing device or the temperature of an object which is below the temperature sensing point or range of the sensing device when the heat sink temperature is above the temperature sensing point or range of the sensing device.

5 Claims, 6 Drawing Figures

VARIABLE TEMPERATURE SENSOR

This invention relates to a variable temperature sensor for detecting and/or controlling the temperature of an object.

There are a large number of thermally responsive devices based on thermocouple, thermometer and bimetallic switch sensors. Thermistors are also available in a large variety of types, covering a broad range of electrical characteristics. They are electrical resistors made of materials whose resistance varies sharply in a known manner with temperature. Typical examples of these thermal switches are given in U.S. Pat. No. 2,924,540, issued Feb. 9, 1960, in which the resistor composition comprises mixtures of palladium and glass, with or without silver, and U.S. Pat. No. 3,408,311, issued Oct. 29, 1968, in which the resistor composition comprises powder mixtures of $Co_2O_3$ and $MnO_2$, with the desired percentages of palladium, silver and inorganic binder powder.

Another group of solid state thermal switches are fabricated using polyconductor materials. These devices can replace thermistors in many applications. Polyconductors can change their state reversibly from semiconductor to metal at a critical temperature; this behaviour is peculiar to a number of transition metal oxides and sulfides such as vanadium dioxides, vanadium sesquioxide, silver sulfide and titanium pentoxide. At a critical temperature, related to the composition of the material, there is a phase change which suddenly alters the electronic structure of the polyconductor to cause a transition from a high resistance to a low resistance state. Typical resistance changes are 100:1 over a few degrees of temperature variation. All these polyconductors are triggered by an ambient temperature exceeding the characteristic transition temperature, resulting in typical resistance changes from greater than $10^5$ ohms to less than $10^2$ ohms.

The above transition metal oxides and sulfides have a fixed transition temperature, i.e., switching temperature related to their electronic structure and to suit various applications, work has been carried out to change their electronic structure by doping them with other materials. In the case of $VO_2$, dopants presently employed have allowed the material characteristic transition temperature to vary over a small temperature range and it has been possible to provide vanadium dioxide devices having switching temperatures of 57°, 65°, 75°, and 85° C. However, the resistance ratio associated with these modified materials is reduced significantly at the switching temperature, e.g. to 5:1. This low resistance ratio is too small for many applications. Consequently, even with doping, the fixed temperature sensing devices are always limited in their application to a limited range of temperature conditions.

It is therefore the object of the present invention to extend the sensing range of any or all of the above temperature sensing devices so as to provide a variable temperature sensor useful in a broad range of temperature conditions.

The variable temperature sensor, in accordance with the invention, comprises a thermally conductive probe having one end adapted to contact an object the temperature of which is to be sensed, measured and/or controlled and its other end adapted to contact a heat sink so as to create a predetermined temperature profile between the two ends of the probe, and a temperature sensing device having a predetermined temperature sensing point or range contacting the thermally conducting probe at a point which is substantially at the temperature sensing point or within the temperature sensing range of the sensing device. Such a variable temperature sensor will permit detection and/or control of the temperature of an object which is above the temperature sensing point or range of the sensing device when the heat sink temperature is below the temperature sensing point or range of the sensing device or detection and/or control of the temperature of an object which is below the temperature sensing point or range of the sensing device when the heat sink temperature is above the temperature sensing point or range of the sensing device.

Various materials can be used to fabricate the probe. Metals and metal alloys are best since they are thermal conductors and therefore can maintain a relatively constant temperature gradient for a considerable distance along their length, whereas insulators have a very high temperature gradient close to the object to be sensed, measured and/or controlled and very little temperature gradient further from that object. Thus, a probe fabricated of metal can be several inches long while one fabricated on an insulator will be shorter because the temperature profile will decay to the heat sink temperature within much less than an inch. It is therefore more difficult to accurately locate a temperature sensing device on a probe made of insulating material.

The time constant of the temperature sensor should preferably be kept as low as possible. The best materials for obtaining a short time constant are silver, gold, copper and aluminum, while the best of these consistent with a low heat drain is aluminum. Aluminum is therefore a good material choice and is preferably used for the probe although the above materials may also be used in certain applications.

The temperature profile along the probe is determined by the partition of heat entering the probe from the hot object at one end of the probe between losses due to radiation and convection to the surroundings, and heat flow to the heat sink at the other end of the probe. However, in most practical applications, it is preferable to create an approximately linear temperature gradient along the probe by minimizing losses due to radiation and convection. One way of achieving this result is to decrease the ratio of circumference to cross sectional area of the probe, which means that a solid geometry is preferable to a hollow geometry for the probe. Furthermore, a cylindrical probe of a given diameter has the smallest ratio of circumference to cross sectional area. Therefore cylindrical configurations are preferably used although other geometries having sufficiently low radiative and conductive losses are also envisaged.

The invention will now be disclosed, by way of example, with reference to a particular embodiment thereof illustrated in the accompanying drawings in which.

Figure 1:
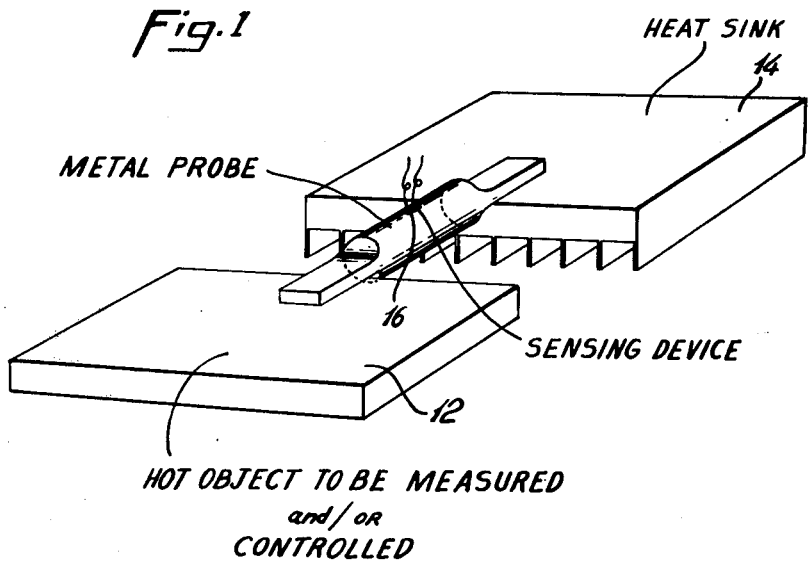
FIG. 1 illustrates an example of a variable temperature sensor in accordance with the invention.

Referring to FIG. 1, there is shown a diagram of a variable temperature sensor in accordance with the invention. The sensor comprises a probe 10 which serves as a temperature divider between an object 12 the temperature of which is to be sensed and/or controlled and a heat sink 14 which may or may not be at or near ambient temperature depending on the application. A temperature sensing device 16 is placed at a predetermined location on the probe which depends on the temperature sensing point or range of the sensing device and on the desired temperature of the object to be detected. It is important to obtain a good heat transfer between the sensing device 16 and the probe 10 and, to that effect, the sensing device 16 may be secured to probe 10 by welding, soldering or by means of a thermo-conductive silicon grease. Of course, the sensing device can also be inserted into a suitable hole drilled into the probe.

Figure 2:
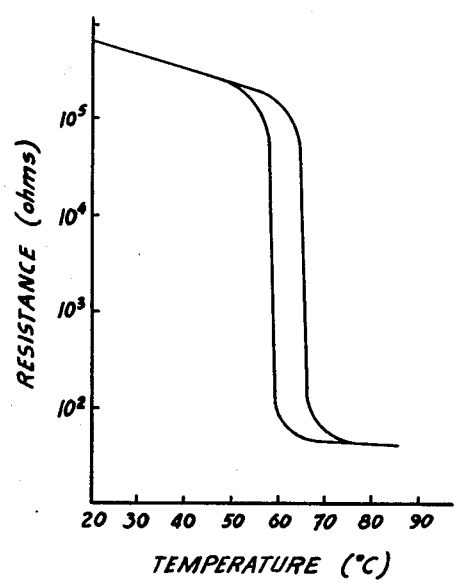
FIG. 2 illustrates the temperature resistance characteristic of a temperature sensing device which may be used with the sensor in accordance with the invention.

The temperature sensing device 16 may be a device having an abrupt transition from a high to a low resistance as its temperature increases past a fixed temperature i.e., affixed temperature switching device. There are a large number of devices exhibiting such switching transition at a fixed temperature. An example of such a device is vanadium dioxide which has a transition temperature of 65° C, as illustrated in FIG. 2. Vanadium dioxide may be doped with various metals to modify its transition temperature so as to make it switch at 57°, 75°, or 85° C. Other examples are vanadium sesquioxide ($V_2O_3$) having a transition temperature of about $-120°$ C, silver sulfide ($Ag_2S$) having a transition temperature of about 150° C and trititanium pentoxide ($Ti_3O_5$) having a transition temperature of about 175° C. It is to be understood, however, that other temperature sensing devices such as thermocouples, thermometers, bimetallic switches, positive or negative temperature coefficient thermistors, etc. can be used.

When one end of the probe is in contact with the object the temperature $T_f$ of which is to be sensed and/or controlled (the heat source) and the other end is attached to the heat sink in a medium at ambient temperature, a temperature profile will develop along it. This temperature profile is determined by the source and heat sink temperature, the laws of conductive, convective and radiative heat loss, and the geometry and composition of the probe. Such temperature profiles along the probe can be calculated by considering the heat flow into and out of any section. The heat flow along the probe at any point is $$Q = -KS \frac{dT}{dx}$$

where $S$ is the cross sectional area of the probe, $K$ is the thermal conductivity of the probe material, and $x$ is the distance along the probe from the point where $T = T_f$.

Consider a section of the probe of length $dx$ and uniform cross-section. The heat flows in and out are:

$$Q_{in} = KS \frac{dT}{dx'} \bigg|_{x' = x}, \text{ and}$$

$$Q_{out} = KS \frac{dT}{dx'} \bigg|_{x' = x + dx}$$

while the heat loss by radiation and convection is $$Q = hA (T - T_a) = h C(T - T_a) dx$$

where $h$ (calories/sec./cm$^2$/° C) is the heat loss parameter, $A$ (cm$^2$) is the surface area of the section, and $C$ (cm) is its circumference. The second equality of the above equation assumes that the probe is of uniform cross-section. Thus heat balance requires that $$\left(-KS \frac{dT}{dx'} \bigg|_{x' = x}\right) - \left(-KS \frac{dT}{dx'} \bigg|_{x' = x + dx}\right) = hC(T - T_a) dx$$

or $$\frac{d^2T}{dx^2} = \frac{hC}{KS} (T - T_a) .$$

The general solution to this equation is $$T = T_a + a_1 e^{mx/l} + a_2 e^{-mx/l}$$

where $$m = l \sqrt{\frac{hC}{KS}} .$$

Assuming that heat enters the probe by conduction at temperature $T_f$ at the source ($x = 0$) and leaves either by convection or radiation to the ambient temperature $T_a$ or by conduction to the heat sink at temperature $T_{hs}$ ($x = l$), and substituting these boundary conditions into the above general equation, the temperature profile becomes:

$$T = T_a + \frac{(T_f - T_a) \sinh [m(1 - x/l)] + (T_{hs} - T_a) \sinh (mx/l)}{\sinh m} \quad (1)$$

where
$T_a$ = ambient temperature
$T_f$ = source temperature
$x$ = distance from end of probe attached to heat source $$m = l\sqrt{\frac{hC}{KS}}$$

$l$ = length of the probe
$T_{hs}$ = heat sink temperature
$K$ = thermal conductivity of probe material
$C$ = circumference of probe
$h$ = convective loss parameter
$S$ = cross-sectional area of the probe The equivalent expressions for conductive heat flow into and out of the probe are:

$$Q_{in} = \frac{KS}{l} m \left[ \frac{(T_f - T_a)}{\tanh(m)} - \frac{(T_{hs} - T_a)}{\sinh(m)} \right] \quad (2)$$

and $$Q_{out} = \frac{KS}{l} m \left[ \frac{(T_f - T_a)}{\sinh(m)} - \frac{(T_{hs} - T_a)}{\tanh(m)} \right] \quad (3)$$

The fraction $X_f$ of heat entering the probe which is conducted to the heat sink becomes $$X_f = \frac{Q_{out}}{Q_{in}} = \frac{1 - \left[\frac{T_{hs} - T_a}{T_f - T_a}\right]\cosh(m)}{\cosh(m) - \left[\frac{T_{hs} - T_a}{T_f - T_a}\right]} \quad (4)$$

In order to minimize the convective and radiative losses, it is desirable to maximize $X_f$. One way of increasing $X_f$ is to decrease the ratio of circumference (C) to cross-sectional area (S), which means that a solid geometry is preferable to a hollow geometry. Futhermore, a cylindrical probe of a given diameter has the smallest ratio C/S of any geometry. However, other geometries may have a smaller convective and radiative loss in some cases so that the cylindrical probe may not always have the maximum $X_f$. None of the above, however, is intended to limit the present application since any geometry can be used.

As mentioned previously, various materials can be used to fabricate the probe. Metals and metal alloys are best since they are thermal conductors and therefore can maintain a relative constant temperature gradient for a considerable distance along their length, whereas insulators have a very high temperature gradient close to the object to be measured and/or controlled and very little temperature gradient further from the object. As it will be understood, it will take a certain amount of time for the sensing device to operate after the probe has been placed in contact with the hot object. It is preferable to reduce such time to a minimum and this will influence the choice of material for the probe. For a given probe, the time constant will be proportional to the product of the mass to be heated and the specific heat ($C_v$) of the probe material, and inversely proportional to the area through which heat is transferred into the probe times the thermal conductivity. Thus $$\tau \alpha \frac{\rho (S \times l) C_v}{KS}$$

where $\rho$ and $K$ are respectively the density and thermal conductivity of the probe material, $l$ is the probe length, and $S$ is its cross-sectional area (assuming uniform cross section).

Thus, $$\tau \alpha l \frac{(\rho C_v)}{K} \quad (5)$$

Values of $K$ and $\rho C_v/K$ are recorded in the following Table I for a selection of metals. From these values it is clear that the best materials for obtaining a short time constant are silver, gold, copper and aluminium, while the best of these consistent with a low heat drain (i.e. a low K) is aluminum. Aluminum is therefore a good material choice. It is to be understood, however, that other metals or even insulators could be used. Suitable insulators are ceramics, plastics and glasses.

TABLE I

| THERMAL CONDUCTIVITY K AND TIME CONSTANT PARAMETER ($\rho C_v/K$) FOR VARIOUS METALS | | |
|---|---|---|
| Material | K(cal./sec./cm/° C) | ($\rho C_v/K$)(sec. cm.$^{-1}$) |
| Al | 0.56 | 1.03 |
| Cu | 0.95 | 0.87 |
| Au | 0.75 | 0.79 |
| Fe | 0.19 | 4.34 |
| Mn | 0.053 | 15.8 |
| Pt | 0.17 | 3.92 |
| Ag | 1.02 | 0.58 |
| W | 0.43 | 1.44 |

The following Table II contains values of $X_f$, $Q_{in}/(T_f - T_a)$ and $Q_{out}/(T_f - T_a)$ for solid cylindrical aluminum probes of different cross-sections and lengths. Two values of convective loss parameter $h$ are used. The value of 3 BTU/hr./ft.$^2$/° F corresponds approximately to that of still air, while that of 11 BTU/hr./ft.$^2$/° F corresponds approximately to that which might be expected if the air velocity is 0.5 to 1.5 ft./sec. This velocity is that estimated in our laboratory where the above probes were tested. In Table II, the heat sink temperature was assumed to be equal to the ambient temperature.

TABLE II

| $X_f$ AND THE HEAT FLOW IN AND OUT OF A SOLID CYLINDRICAL ALUMINUM PROBE, FOR DIFFERENT CROSS SECTIONS AND LENGTHS | | | | | |
|---|---|---|---|---|---|
| Diameter (in.) | Length (in.) | h (BTU/hr./ft.$^2$/° F) | $X_f$ | $Q_{in}/(T_f-T_a)$ (mW/° C) | $Q_{out}/(T_f-T_a)$ (mW/° C) |
| 0.040 | 2 | 3 | 0.72 | 4.7 | 3.4 |
|  |  | 11 | 0.38 | 6.7 | 2.5 |
|  | 3 | 3 | 0.52 | 3.8 | 1.9 |
|  |  | 11 | 0.17 | 6.3 | 1.1 |
|  | 4 | 3 | 0.35 | 3.4 | 1.2 |
|  |  | 11 | 0.08 | 6.2 | 0.47 |
| 0.060 | 2 | 3 | 0.85 | 16.9 | 14.2 |
|  |  | 11 | 0.57 | 21.3 | 12.2 |
|  | 3 | 3 | 0.7 | 12.7 | 8.8 |
|  |  | 11 | 0.34 | 18.6 | 6.4 |

TABLE II-continued
$X_f$, AND THE HEAT FLOW IN AND OUT OF A SOLID CYLINDRICAL ALUMINUM PROBE, FOR DIFFERENT CROSS SECTIONS AND LENGTHS

| Diameter (in.) | Length (in.) | h (BTU/hr./ft.$^2$/° F) | $X_f$ | $Q_{in}/(T_f-T_a)$ (mW/° C) | $Q_{out}/(T_f-T_a)$ (mW/° C) |
|---|---|---|---|---|---|
|  | 4 | 3 | 0.55 | 10.9 | 6.0 |
|  |  | 11 | 0.20 | 17.8 | 3.5 |
| 0.120 | 2 | 3 | 0.89 | 36.7 | 32.7 |
|  |  | 11 | 0.68 | 43.6 | 29.4 |
|  | 3 | 3 | 0.78 | 26.7 | 20.7 |
|  |  | 11 | 0.46 | 36.1 | 16.6 |
|  | 4 | 3 | 0.66 | 22.2 | 14.5 |
|  |  | 11 | 0.30 | 33.6 | 9.9 |
|  | 5 | 3 | 0.54 | 19.9 | 10.7 |
|  |  | 11 | 0.19 | 32.7 | 6.1 |

The specific diameter and length to be chosen will depend on the application. For example, if the switching temperature is high, the factor $(T_f-T_a)$ will be large, and it will be necessary to use a small cross-section in order to keep the heat flow to a reasonable level. If $h = 11$ BTU/hr./ft.$^2$/° F, wich is the experimentally determined value, $T_f = 225°$ C and $T_a = 25°$ C, $Q_{in} = 1.3$ watts for a 2-in. long 0.040-in. diameter probe while it would be 8.7 watts for a 2-in. long 0.120 in. diameter probe. In general, the largest possible diameter consistent with reasonable heat flow should be used, in order to maximize $X_f$.

There is a similar trade-off with probe length; longer lengths allow better temperature resolution as shown below, but the value of $X_f$ decreases rapidly with the increasing length. In addition, the time constant increases with probe length as seen in equation (5) above.

Figure 3:
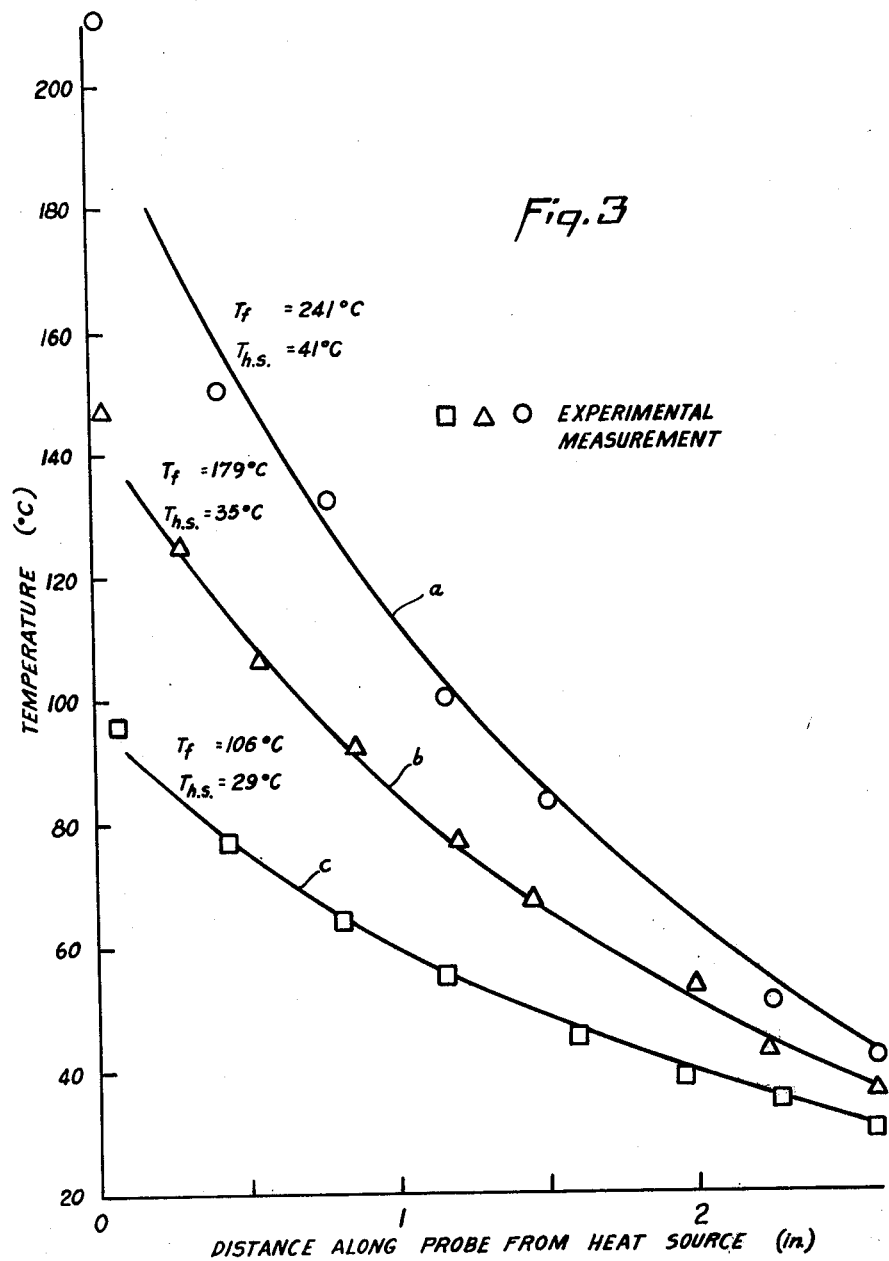
FIG. 3 illustrates three typical temperature profiles along a cylindrical aluminum probe of a predetermined configuration.

The solid curves of FIG. 3 show calculated profiles $a$, $b$ and $c$ for a specific probe made of a cylindrical aluminum rod having a length of about 2.6 inches and a diameter of about 0.062 inch. The temperature profiles are traced for three different source temperatures 241° C, 179° C and 106° C at an ambient temperature of 25° C and assuming a convective loss parameter $h$ of 10.6 BTU/hr./ft.$^2$/° F. The temperature of the heat sink for profiles $a$, $b$ and $c$ were 41° C, 35° C and 29° C respectively, values slightly above the ambient temperature. The specific points shown in FIG. 3 are measured temperature values along the probe which show good agreement with the theoretical curves. It will be noted that the curves $a$, $b$ and $c$ are nearly straight curves which means that the convective and radiative losses are low.

If a probe of given geometry and composition is to be used as a variable temperature sensor which will switch when the temperature being measured and/or controlled ($T_f$) has reached a particular value, then the fixed temperture switching device must be mounted at a point on the probe where the temperature is at its own switching temperature. For example, if the switching device is a vanadium dioxide device having a switching temperature of 65° C, the point $x_{65}$ along the probe is given approximately by solving the above equation (1) for $x = x_{65}$ when $T = 65°$ C. It will be understood that the temperature profile of the probe is dependent upon the convective loss parameter $h$ and that this factor must be taken into consideration in designing the variable temperature sensor. However, it has been found that the temperature at which the variable temperature sensor will switch for a given $x/l$ becomes relatively insensitive to changes in the convective loss parameter $h$ if the probe is designed so that less than 50% of the incoming heat is lost by radiation and convection.

The resolution of the device can be estimated by calculating the change in the switching temperature $T_f$ which will result from a small change in the position at which the fixed temperature switching device is mounted. Using the equation for temperature given above, and differentiating it with respect to position, the following equation is obtained $$\frac{d(x_M/l)}{dT_f} = \frac{\tanh(m[1-x_M/l])}{m(T_f-T_a)} \left[ 1 - \frac{T_{hs}-T_a}{T_f-T_a} \frac{\cosh(mx_M/l)}{\cosh(m[1-x_M/l])} \right]^{-1} \quad (6)$$

where $x_M$ is the point along the probe where $T = T_M$, the critical temperature of the fixed temperature switching device.

Using this equation, the fraction of the probe length that the fixed temperature switching device must be moved to give a 10° C change in temperature can be calculated. This result can then be used to establish the useful range of a variable temperature sensor. For example, consider a probe 3 inches long, on which the switching device can be positioned within 50 thousandths of an inch. For the purpose of this example, the heat sink temperature and ambient temperature are both assumed equal to 25° C. The uncertainty in the switching temperature of the device due to the 0.050 inch uncertainty in sensing device position along the probe is summarized in the following Table III.

| $T_f$(° C) | Uncertainty in Switching Temperature (° C) | | | |
|---|---|---|---|---|
|  | $X_f$ = 99% | 50% | 25% | 1% |
| 75 | 3.1 | 4.1 | 5.4 | 13.2 |
| 100 | 7.0 | 7.3 | 8.6 | 19.9 |
| 125 | 12.5 | 11.6 | 12.3 | 26.5 |
| 150 | 19.5 | 17.0 | 16.6 | 33.1 |
| 175 | 28.0 | 23.5 | 21.4 | 39.8 |
| 200 | 38.1 | 31.3 | 27.2 | 46.4 |
| 250 | 63.0 | 50.3 | 40.9 | 59.7 |
| 300 | 94.1 | 74.0 | 57.8 | 73.0 |

It can be seen from the above table that the device could sense and/or control a temperature as high as about 115° C with an accuracy of ± 5° C and as high as about 160° C with an accuracy of ± 10° C, provided that convective and radiative losses are less than 75%. However, by 250° C the uncertainty is higher than ±

30° C even when there are no radiative and convective losses, and by 300° C this uncertainty is approaching ± 50° C.

Figure 4:
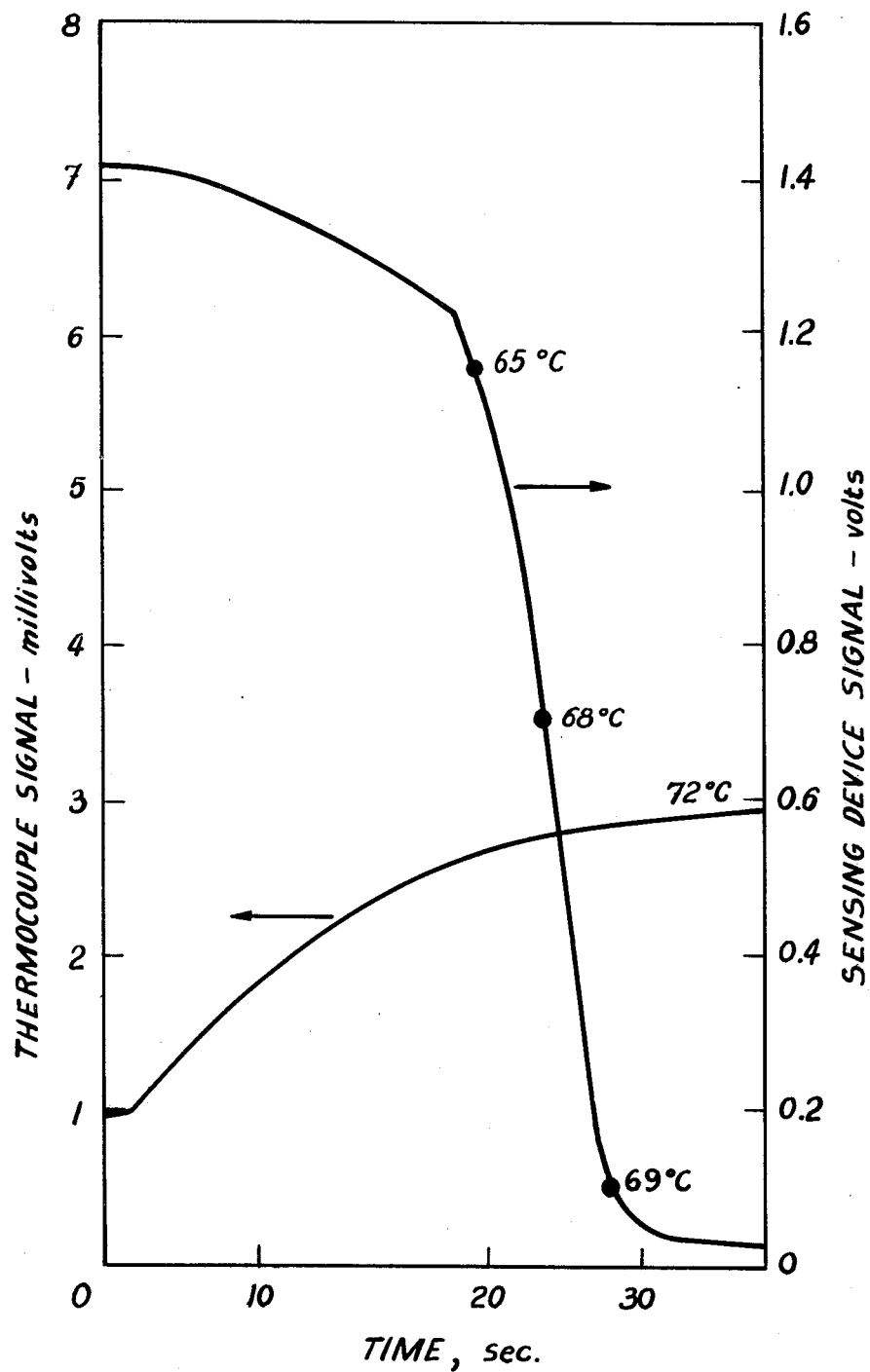
FIG. 4 illustrates the variation of thermocouple and sensing device signal as the function of time.

FIG. 4 is a curve showing the time required for the fixed temperature switching device to reach its switching temperature when the end of the probe is suddenly connected to a heat source. The voltage across the fixed temperature switching device is recorded as a function of time. The temperature at the point the fixed temperature switching device is mounted is recorded as well. It will be seen that the voltage across the fixed temperature switching device drops practically to 0 after 30 seconds.

The result of experiments performed on three solid probes of circular cross-section fabricated of aluminum are shown in the following Table IV. It will be seen that the fixed temperature switching device (FTSD) distance from the hot end of the probe compares to calculations.

where
$T_o$ = the temperature of the heat sink at $t = 0$, $$\eta = \frac{KSm}{lc_p M_{hs}} [(1-f) + (f)\cosh(m)]/D,$$

$$D = (1-f) \sinh[m(1-x_M/l)] + f[\sinh(m) - \sinh(mx_M/l)],$$

$T_M$ = the critical temperature of the fixed temperature switching device, $x_M$ = the point along the probe where $T = T_M$, and $c_p$ and $M_{hs}$ are the heat capacity and mass of the heat sink.

The vaues of ambient temperature and finally of the actual control temperature $T_f$ are calculated using the result of equation (8):

$$T_a = T_{hs} + (f) \sinh(m) (T_M - T_{hs})/D, \text{ and} \quad (9)$$

$$T_f = T_a + (1-f) \sinh(m) (T_M - T_{hs})/D. \quad (10)$$

TABLE IV

EXPERIMENTAL RESULTS OBTAINED WITH VARIOUS SOLID CYLINDRICAL ALUMINUM PROBES

| Device Number | Length (in) | Diameter (in) | FTSD Distance From Hot End (in.) | FTSD Distance From Hot End as Calculated (in.) | Average Source Operating Temperature (° C) | FTSD Response Time (sec.) |
|---|---|---|---|---|---|---|
| I | 2.70 | 0.062 | 1.30 | 1.55 | 163 | 24 |
| II | 2.50 | 0.062 | 1.75 | 1.85 | 266 | 30 |
| III | 2.45 | 0.062 | 0.95 | 1.28 | 150 | 26 |

One possible application of the above disclosed variable temperature sensor would be to the control of small domestic appliances, such as a hair curling iron. In such an application, the probe is confined in a small area with the result that the ambient temperature increases with time. The heat sink is also of finite size so that the temperature of the heat sink also increases with time. Both of these factors will cause the temperature of the object to be controlled at a temperature $T_f$ which is less than the desired temperature $T_c$ after a certain period of time. The time variation of controlled temperature can be calculated on the basis of the following assumptions:

a. Ambient temperature is intermediate between the heat sink temperature $T_{hs}$ and the control temperature $T_f$. Specifically it is assumed that $T_a$ rises to a fraction f of the difference between $T_{hs}$ and $T_f$, i.e.

$$T_a = T_{hs} + f(T_f - T_{hs}); \text{ and} \quad (7)$$

b. there are no heat losses from the heat sink, and hence $T_{hs}$ at any time can be calculated from the total heat flow into the heat sink up to that time.

The resulting expression for the heat sink temperature t seconds after heating has been started is $$T_{hs} = T_M - (T_M - T_o) e^{-\eta t} \quad (8)$$

Equation (10) describes the time variation of control temperature, for various assumed probe and heat sink parameters and for different values of f.

EXAMPLE I

In the application of the variable temperature sensor to the control of a curling iron, the heater element of such curling iron is to be controlled at 135° C ± 5° C for a period of 30 minutes. For design purposes, this will be taken as an initial control temperature of $T_c = 140°$ C with the temperature falling by less than 10° C in 30 minutes. The physical dimensions of the curling iron handle suggest a probe length of 3 inches and a heat sink mass of 20 to 45 grams. Aluminum has been selected as the heat sink material due to its high specific heat ($c_p = 0.22$ cal./gm/° C).

The major variable parameter is the probe diameter. There is also some choice of fixed temperature switching devices ($T_M = 57°$, 65°, 75°, or 85° C) and of heat sink mass $M_{hs}$.

Table V illustrates the effect of various values of the design parameters on the control temperature $T_f$ after 30 min. operation, for an initial ($t = 0$) design control temperature of 140° C. The value of the heat sink temperature is also recorded; an initial value of $T_{hs}(t=0) = 25°$ C was used. The ambient temperature $T_a$ can be calculated from the tabulated values of $T_f$ and $T_{hs}$ using the assumed value of f and eq. (7).

TABLE V

CONTROL TEMPERATURE OF THE CURLING IRON HEATING

| FTSD Temp. $T_M$(° C) | Heat Sink Mass $M_{hs}$ (grams) | Probe Diameter (inches) | $X_f$ | f = 0 $T_{hs}$(° C) | f = 0 $T_f$(° C) | f = 0.05 $T_{hs}$(° C) | f = 0.05 $T_f$(° C) | f = 0.10 $T_{hs}$(° C) | f = 0.10 $T_f$(° C) |
|---|---|---|---|---|---|---|---|---|---|
| 65 | 20 | 0.01 | 0.10 | 25.2 | 139.0 | 25.7 | 130.7 | 25.9 | 123.6 |
| | | 0.02 | 0.24 | 28.5 | 133.5 | 28.8 | 127.5 | 29.1 | 122.3 |
| | | 0.03 | 0.35 | 33.9 | 123.3 | 34.3 | 119.2 | 34.6 | 115.4 |

TABLE V-continued

| | | | CONTROL TEMPERATURE OF THE CURLING IRON HEATING | | | | | | |
|---|---|---|---|---|---|---|---|---|---|
| FTSD Temp. | Heat Sink Mass $M_{hs}$ | Probe Diameter | | f = 0 | | f = 0.05 | | f = 0.10 | |
| $T_M$ (° C) | (grams) | (inches) | $X_f$ | $T_{As}$(° C) | $T_f$(° C) | $T_{As}$(° C) | $T_f$(° C) | $T_{As}$(° C) | $T_f$(° C) |
| | | 0.04 | 0.43 | 40.7 | 110.7 | 41.1 | 107.8 | 41.4 | 105.1 |
| | | 0.05 | 0.49 | 47.5 | 97.8 | 47.9 | 95.8 | 48.2 | 94.1 |
| 65 | 45 | 0.01 | 0.10 | 25.2 | 139.6 | 25.3 | 131.4 | 25.4 | 124.3 |
| | | 0.02 | 0.24 | 26.6 | 137.0 | 26.7 | 131.1 | 26.9 | 125.8 |
| | | 0.03 | 0.35 | 29.2 | 132.1 | 29.4 | 127.7 | 29.6 | 123.7 |
| | | 0.04 | 0.43 | 32.9 | 125.2 | 33.2 | 121.9 | 33.4 | 118.8 |
| | | 0.05 | 0.49 | 37.3 | 116.9 | 37.6 | 114.4 | 37.8 | 112.1 |
| 85 | 20 | 0.01 | 0.10 | 25.5 | 139.5 | 25.7 | 135.1 | 25.2 | 130.6 |
| | | 0.02 | 0.24 | 28.5 | 136.8 | 29.0 | 133.2 | 29.4 | 129.9 |
| | | 0.03 | 0.35 | 34.3 | 131.5 | 34.8 | 128.7 | 35.4 | 126.1 |
| | | 0.04 | 0.43 | 41.9 | 124.5 | 42.5 | 122.3 | 43.2 | 120.3 |
| | | 0.05 | 0.49 | 50.5 | 116.7 | 51.1 | 115.0 | 51.7 | 113.4 |
| 85 | 45 | 0.01 | 0.10 | 25.2 | 139.8 | 25.3 | 135.4 | 25.4 | 131.3 |
| | | 0.02 | 0.24 | 26.6 | 138.5 | 26.8 | 135.1 | 27.0 | 131.8 |
| | | 0.03 | 0.35 | 29.3 | 136.1 | 26.9 | 133.3 | 29.9 | 130.7 |
| | | 0.04 | 0.43 | 33.2 | 132.5 | 33.6 | 130.2 | 33.9 | 128.1 |
| | | 0.05 | 0.49 | 38.1 | 128.0 | 38.4 | 126.2 | 38.8 | 124.4 |

Several design criteria may be derived from an examination of Table V:

i. The maximum value of $T_M$ which is consistent with electrical characteristics of the FTSD switching device should be used.

ii. The maximum heat sink mass consistent with the physical design requirements should be used.

iii. An increase in the fractional rise f, defined in equation (7), of ambient temperature from 0 to 5 or 10% has a strong effect, resulting in a significant drop in control temperature. This effect is stongest for small probe diameters ($X_f$<0.3) when convective losses predominate, with the result that the control temperature after 30 minutes does not depend as strongly on probe diameter when ambient temperature rises more rapidly than heat sink temperature (f>0).

iv. When heat sink and ambient temperatures remain equal (f=0), the control temperature after 30 minutes falls monotonically with increasing probe diameter. However the relative importance of convective losses ($\alpha 1/X_f$) decreases with increasing probe diameter and it has been shown that excessive convective losses ($X_f$<0.25) result in a high sensitivity of control temperature to the exact positioning of the FTSD.

Although the material used to fabricate the probe is preferably metal, as mentioned previously, it is to be understood that insulating material may be used in certain applications. It is also to be understood that the probe geometry is not limited to cylindrical rods and that other geometries can be used provided that the convective heat-transfer losses are kept to a satisfactory low value. Finally, the temperature to be measured and/or controlled may be below the switching temperature of the sensing device if the ambient temperature is above the switching temperature of such sensing device.

Figure 5:
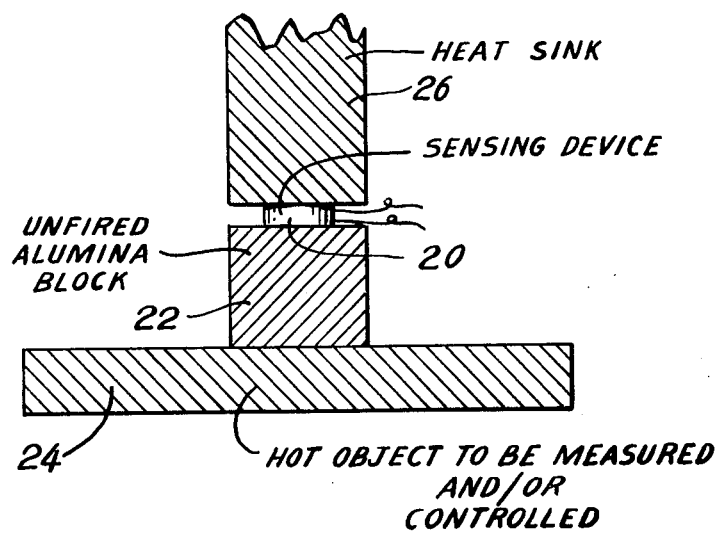
FIG. 5 illustrates another example of a variable temperature sensor in accordance with the invention.
Figure 6:
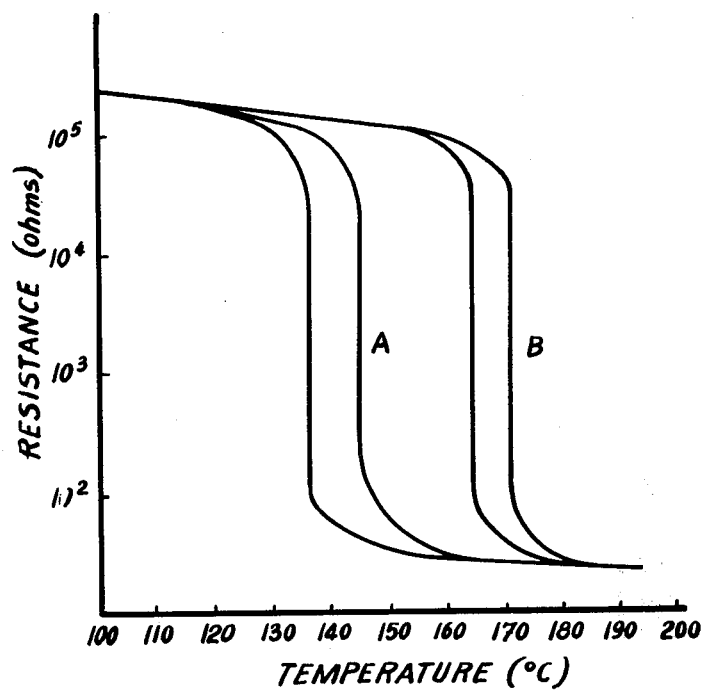
FIG. 6 illustrates the temperature resistance characteristic of the sensor of FIG. 5.

An example of a variable temperature sensor using a probe of insulating material will be disclosed with reference to FIGS. 5 and 6.

EXAMPLE II

A sensing device 20, in the form of a vanadium dioxide ($VO_2$) thermal switch, is mounted on a block of unfired alumina 22 of about ½-in. × ½-in. × ½-in., interpositioned between an object 24 the temperature of which is to be measured and/or controlled and a second block of alumina 26 acting as a heat sink. The sensing device 20 is placed in a metal casing which also provides heat transfer between the block of unfired alumina and the heat sink. FIG. 2 shows the normal characteristic transition temperature of the sensing device 20. FIG. 6 shows responses of the temperature sensor to two rates of heated surface temperature increase. The hysteresis loop A is the curve of switch resistance change at 0.25° C per minute; the hysteresis loop B is the curve of switch resistance change at 15° C per minute. The shaft of curve B from curve A may be reduced by using a material of higher thermal conductivity. In this way, the response time of the sensor can be optimized for different rates of temperature change of the heated object and for the required switching temperature.

It is also to be understood that numerous applications of the above disclosed temperature sensor are envisaged:

1. Large and small appliances, such as thermostatic control of a kettle, over-temperature sensor in a stove, presence of a pilot light on a gas stove, handle temperature sensor on an iron, hot water controller, fire alarm system.

2. Instruments such as package temperature controller, power supply over-temperature sensor.

3. Machines such as turbine temperature sensor, motor winding temperature alarm, high friction dynamic systems temperature sensor.

4. Railway car hot boxes.

What is claimed is:

1. A variable temperature sensor for detecting the temperature of an object comprising:

a. a thermally conductive metal probe having one end thereof adapted to contact an object the temperature of which is to be sensed, and its other end adapted to contact a heat sink so as to create a substantially linear temperature profile between the two ends of the thermally conductive probe; and b. a fixed temperature switching device having a predetermined switching temperature attached to said thermally conductive probe at a point along the length of said probe which is substantially at the switching temperature of the switching device when a desired predetermined substantially linear temperature profile is present; whereby, depending on the switching temperature of said fixed temperature switching device, detection of either the temperature of an object which is above the switching temperature of the temperature switching device when the heat sink temperature is below the switching temperature of the switching device or the temperature of an object which is below the switching temperature of the temperature switching device when the heat sink temperature is above the switching temperature of the switching device is permitted.

2. A variable temperature sensor as defined in claim 1, wherein said metal is selected from the group consisting of silver, gold, copper, aluminum, tungsten, iron and platinum.

3. A variable temperature sensor as defined in claim 2, wherein said metal is aluminum.

4. A variable temperature sensor as defined in claim 3, wherein said probe is in the form of a cylindrical rod.

5. A variable temperature sensor as defined in claim 1, wherein said fixed temperature switching device is a vanadium oxide device.

* * * * *